(12) United States Patent
Sabater et al.

(10) Patent No.: US 10,075,696 B2
(45) Date of Patent: Sep. 11, 2018

(54) METHOD AND DEVICE FOR ESTIMATING DISPARITY ASSOCIATED WITH VIEWS OF A SCENE ACQUIRED WITH A PLENOPTIC CAMERA

(71) Applicant: THOMSON LICENSING, Issy de Moulineaux (FR)

(72) Inventors: Neus Sabater, Rennes (FR); Valter Drazic, Cesson-Sevigne (FR); Gustavo Luiz Sandri, Cesson Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 359 days.

(21) Appl. No.: 14/554,897

(22) Filed: Nov. 26, 2014

(65) Prior Publication Data

US 2015/0189254 A1    Jul. 2, 2015

(30) Foreign Application Priority Data

Nov. 29, 2013    (EP) .................................... 13306640

(51) Int. Cl.
*H04N 13/02* (2006.01)
*G06T 7/00* (2017.01)
*H04N 13/00* (2018.01)

(52) U.S. Cl.
CPC .......... *H04N 13/0257* (2013.01); *G06T 7/97* (2017.01); *H04N 13/0232* (2013.01); *G06T 2207/10052* (2013.01); *H04N 2013/0081* (2013.01)

(58) Field of Classification Search
CPC ............. H04N 13/0257; H04N 17/002; H04N 13/0232; G06T 2207/10148
(Continued)

(56) References Cited

U.S. PATENT DOCUMENTS 8,189,089 B1    5/2012    Georgiev et al.
8,446,516 B2    5/2013    Pitts et al.
(Continued)

FOREIGN PATENT DOCUMENTS

JP    2009288042 A2    12/2009

OTHER PUBLICATIONS

Halawana: "Partial Demosaicing of CFA Images for Stereo Matching";Jan. 1, 2010 (Jan. 1, 2010); pp. 69-71.
(Continued)

*Primary Examiner* — Masum Billah
(74) *Attorney, Agent, or Firm* — Tutunjian & Bitetto, P.C.

(57) ABSTRACT

The invention is related to a method of determining a disparity information associated with at least a block of pixel of a first view of a scene, a matrix of views comprising the first view and a plurality of second views of the scene. The first and second views are obtained by demultiplexing a raw image of the scene acquired with a plenoptic camera but are not demosaiced. The method comprises comparing a first color pattern associated with the first block of the first view with at least one second color pattern associated with at least one second block of at least one of the second views belonging to the row or the column comprising the first view in the matrix; selecting at least one second block if the associated second color pattern corresponds at least partially to the first color pattern; and determining the disparity information associated with the first block by using the selected at least one second block and the first block.

13 Claims, 8 Drawing Sheets

(58) Field of Classification Search
USPC .................................................. 348/222, 47
See application file for complete search history.

(56) References Cited

U.S. PATENT DOCUMENTS

| | | | | |
|---|---|---|---|---|
| 2011/0199458 A1* | 8/2011 | Hayasaka | .......... | H04N 13/0232 348/43 |
| 2013/0120356 A1* | 5/2013 | Georgiev | .............. | G06T 15/205 345/419 |
| 2013/0120605 A1 | 5/2013 | Georgiev et al. | | |
| 2013/0128081 A1* | 5/2013 | Georgiev | .......... | G02B 27/1066 348/240.2 |
| 2013/0222555 A1 | 8/2013 | Nagasaka et al. | | |

OTHER PUBLICATIONS

Search Report Dated Feb. 6, 2014.
Digital Photography Review, Lytro adds 'perspective shift' and 'living filters' to light field captures, https://www.dpreview.com/articles/9220989207/lytro-adds-perspective-shift-and-living-filters-to-light-field-cameras.
Tom E. Bishop, et al., Plenoptic Depth Estimation From Multiple Aliased Views, 2009 IEEE 12th International Conference on Computer Vision Workshops, ICCV Workshops, Sep. 27-Oct. 4, 2009, pp. 1-8, IEEE.
Steven P. Carpenter, Depth Estimation with a Plenoptic Camera, Auburn University, American Institute of Aeronautics and Astronautics, 2013, Auburn University.
Sing Bing Kang, et al., Extracting View-Dependent Depth Maps from a Collection of Images, International Journal of Computer Vision—Special Issue on Research at Microsoft Corporation, Jul. 2004, pp. 139-163, vol. 58, Issue 2, Kluwer Academic Publishers Hingham, MA, USA.
Sven Wanner et al., Globally Consistent Multi-Label Assignment on the Ray Space of 4D Light Fields, CVPR '13 Proceedings of the 2013 IEEE Conference on Computer Vision and Pattern Recognition, Jun. 23-28, 2013, pp. 1011-1018, IEEE Computer Society, Washington, DC, USA.

* cited by examiner

METHOD AND DEVICE FOR ESTIMATING DISPARITY ASSOCIATED WITH VIEWS OF A SCENE ACQUIRED WITH A PLENOPTIC CAMERA

This application claims the benefit, under 35 U.S.C. § 119 of European Patent Application No. 13306640.7, filed Nov. 29, 2013.

1. DOMAIN OF THE INVENTION

The invention relates to the domain of plenoptic camera and more specifically to the estimation of disparity associated with one or more views of a scene acquired with a plenoptic camera.

2. PRIOR ART

According to the prior art, it is known to acquire different views of a same scene in a single snapshot with a plenoptic camera, also called light-field camera. A direct application of such a plenoptic camera is 3D reconstruction. Indeed, after demultiplexing of the raw image acquired with the photosensor array of the plenoptic camera, the recovered views of the scene are already in epipolar geometry horizontally and vertically, so the disparity between them can be estimated without stereo rectification. This is a huge advantage compared to binocular 3D stereo reconstruction from images captured with a conventional camera.

Nevertheless, estimating disparity from views resulting from the demultiplexing of the raw image suffers from several issues. For example, the views resulting from the demultiplexing offers only one single color information for some of the pixels of the views while other pixels do not have any color information associated with them: the spatial color sampling of such views is often jagged and incomplete, which leads to erroneous disparity estimation.

One known solution to such disparity estimation issues is to first demosaiced the raw image before demultiplexing it in order to have full color information for each pixel of each view of the scene resulting from the demultiplexing. But performing the demosaicing before the demultiplexing may lead to other issues, such as inter-view crosstalk. Indeed, as to recover the full color information for one given pixel of the raw image, pixels belonging to the neighborhood of this given pixel may be used, even if these neighboring pixels belongs to other view(s) than the view of the given pixel. Estimating the disparity on such views suffering from inter-view crosstalk may also lead to disparity errors.

3. SUMMARY OF THE INVENTION

The purpose of the invention is to overcome at least one of these disadvantages of the prior art.

More specifically, the purpose of the invention is to determine reliable disparity information associated with a view of a scene resulting from the demultiplexing of a raw image acquired with a plenoptic camera, the view being not demosaiced.

The invention relates to a method of determining a disparity information associated with at least a part of a first view of a scene, a matrix of views comprising the first view and a plurality of second views of the scene different from the first view being obtained from a raw image of the scene acquired with a plenoptic camera, a plurality of color components being associated with pixels of the raw image in such a way that each single color component of the plurality of color components is associated with a different pixel of the raw image according to a predetermined pattern, the first and second views each comprising pixels selected among the pixels of the raw image with the associated single color component. The method comprises the steps of:

comparing a first color pattern associated with a first block of at least one pixel of the first view with at least one second color pattern associated with at least one second block of at least one pixel in at least one of the second views belonging to the row or the column comprising the first view in the matrix, selecting the at least one second block if the associated second color pattern corresponds at least partially to the first color pattern, determining the disparity information associated with the first block by using the selected at least one second block and the first block.

According to a particular characteristic, the first color pattern is compared with:

at least one second color pattern associated with at least one second block of at least one second view belonging to the row comprising the first view in the matrix, and with at least one second color pattern associated with at least one second block of at least one second view belonging to the column comprising the first view in the matrix.

Advantageously, a first disparity value is determined by using the first block and at least one selected second block belonging to the row comprising the first view and a second disparity value is determined by using the first block and at least one selected second block belonging to the column comprising the first view, the disparity information being determined according to the first disparity value and the second disparity value if a difference between the first disparity value and the second disparity value is less than a threshold value.

According to a specific characteristic, a first disparity level is determined for each second view belonging to the row comprising the first view and having a second block with a second color pattern corresponding to the first color pattern, the first disparity value corresponding to the median value of the first disparity levels, and wherein a second disparity level is determined for each second view belonging to the column comprising the first view and having a second block with a second color pattern corresponding to the first color pattern, the second disparity value corresponding to the median value of the second disparity levels.

Advantageously, the disparity information corresponds to one of the first disparity value and the second disparity value.

According to another characteristic, the disparity information corresponds to the average of the first disparity value and second disparity value.

Advantageously, a cost function associated with a plurality of candidate disparity information is computed, the plurality of candidate information taking values comprised between a minimal disparity value and a maximal disparity value, the minimal and maximal disparity values depending from the plenoptic camera, wherein the determined disparity information corresponds to the candidate disparity information for which the cost function is minimal.

According to a particular characteristic, the method further comprises interpolating the cost function and interpolating the first view and the at least one second view before determining the disparity information.

The invention also relates to a device configured for determining a disparity information associated with at least a part of a first view of a scene, a matrix of views comprising the first view and a plurality of second views of the scene different from the first view being obtained from a raw image of the scene acquired with a plenoptic camera, a plurality of color components being associated with pixels of the raw image in such a way that each single color component of the plurality of color components is associated with a different pixel of the raw image according to a predetermined pattern, the first and second views each comprising pixels selected among the pixels of the raw image with the associated single color component. The device comprises at least one processor configured for:

comparing a first color pattern associated with a first block of at least one pixel of the first view with at least one second color pattern associated with at least one second block of at least one pixel in at least one of the second views belonging to the row or the column comprising the first view in the matrix, selecting the at least one second block if the associated second color pattern corresponds at least partially to the first color pattern, determining the disparity information associated with the first block by using the selected at least one second block and the first block.

Advantageously, the at least one processor is further configured for comparing said first color pattern with:

at least one second color pattern associated with at least one second block of at least one second view belonging to the row comprising the first view in the matrix, and with at least one second color pattern associated with at least one second block of at least one second view belonging to the column comprising the first view in the matrix.

According to a specific characteristic, the at least one processor is further configured for:

determining a first disparity value by using the first block and at least one selected second block belonging to the row comprising the first view, determining a second disparity value by using the first block and at least one selected second block belonging to the column comprising the first view, comparing the difference between the first disparity value and the second disparity value with a threshold value, determining the disparity information according to the first disparity value and the second disparity value if the difference is less than the threshold value.

According to another characteristic, the at least one processor is further configured for:

determining a first disparity level for each second view belonging to the row comprising the first view and having a second block with a second color pattern corresponding to the first color pattern, the first disparity value corresponding to the median value of said first disparity levels, determining a second disparity level for each second view belonging to the column comprising the first view and having a second block with a second color pattern corresponding to the first color pattern, the second disparity value corresponding to the median value of said second disparity levels.

According to a specific characteristic, the at least one processor is further configured for determining a cost function associated with a plurality of candidate disparity information, the plurality of candidate information taking values comprised between a minimal disparity value and a maximal disparity value, the minimal and maximal disparity values depending from the plenoptic camera, wherein the determined disparity information corresponds to the candidate disparity information for which the cost function is minimal.

Advantageously, the at least one processor is further configured for interpolating the cost function and interpolating the first view and the at least one second view before determining the disparity information.

The invention also relates to a computer program product comprising instructions of program code for executing steps of the method of determining disparity information associated with at least a part of a first view of a scene, when the program is executed on a computing device.

4. LIST OF FIGURES

The invention will be better understood, and other specific features and advantages will emerge upon reading the following description, the description making reference to the annexed drawings wherein.

Figure 3:
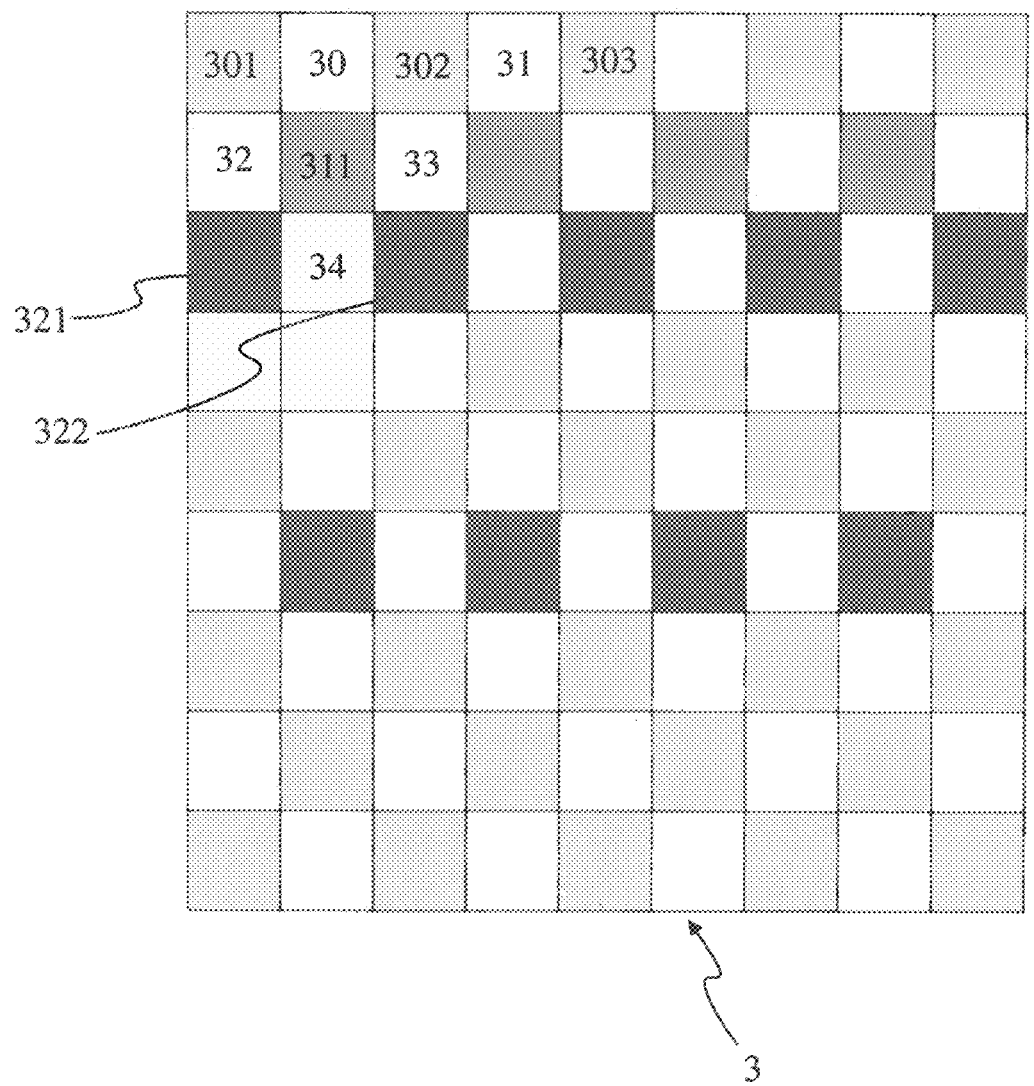
FIG. 3 shows a view of the scene resulting from the demultiplexing of the raw image of FIG. 2, according to a particular embodiment of the invention.
Figure 7:
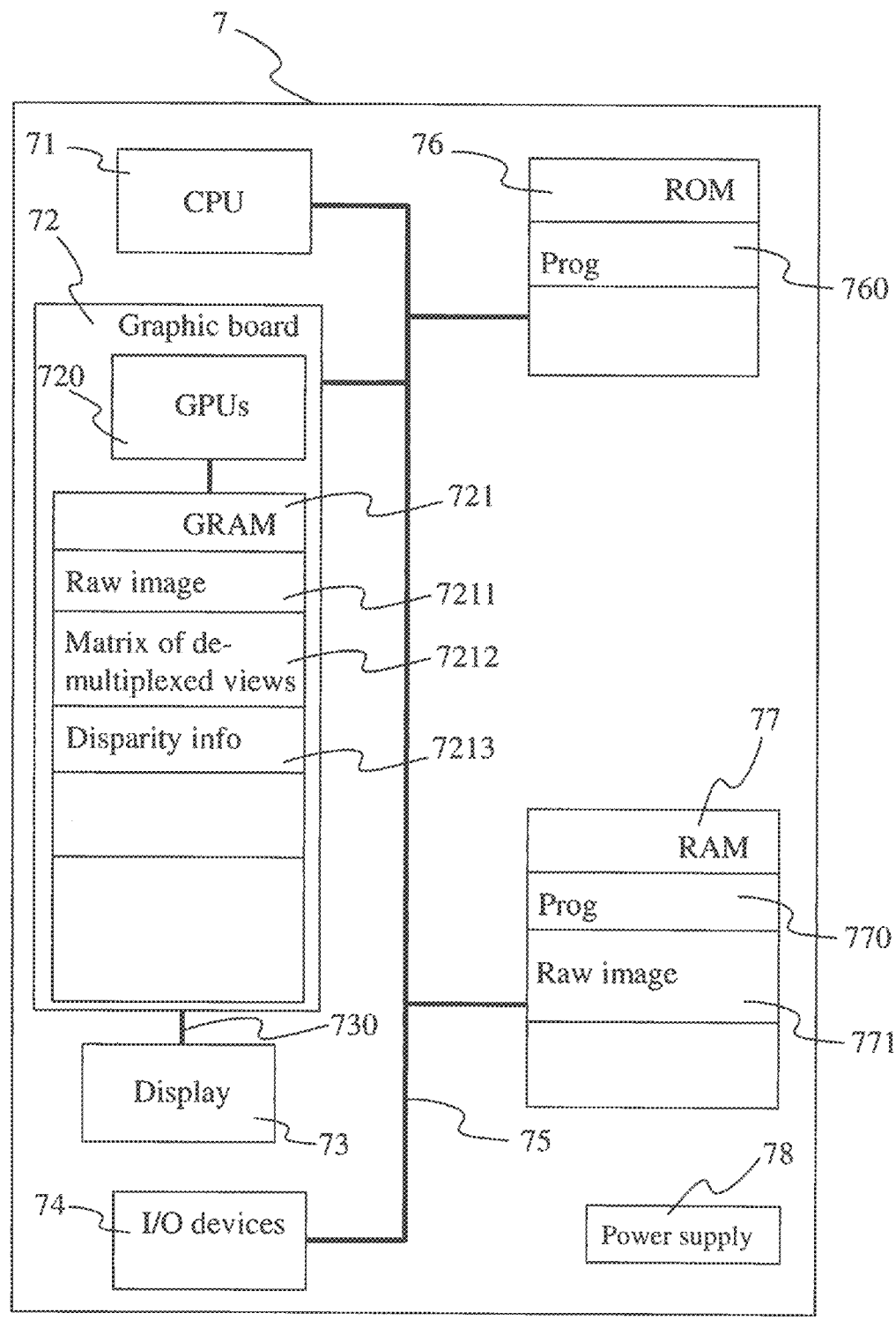
Figure 8:
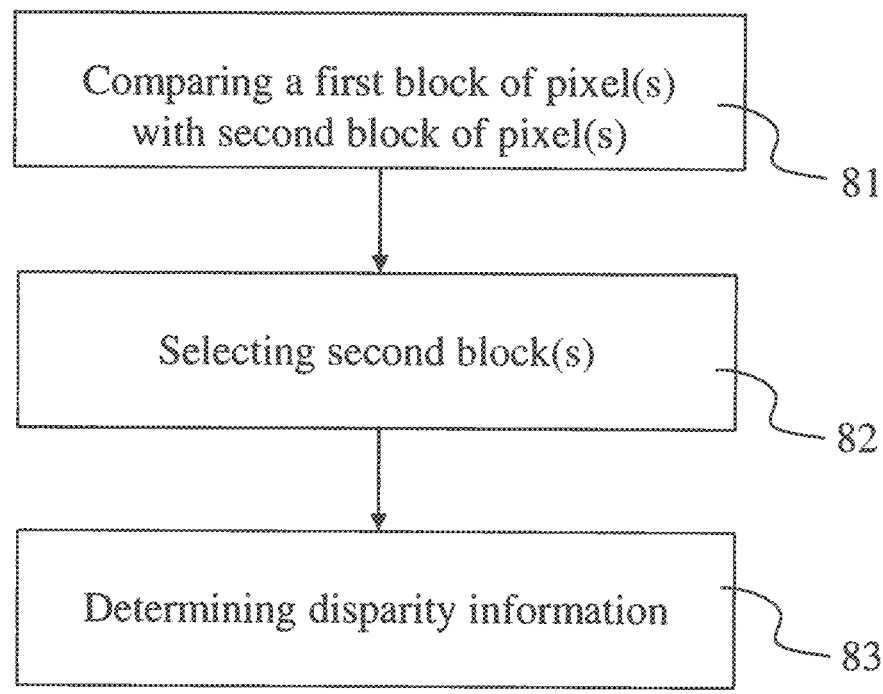

FIG. 7 diagrammatically shows a device implementing a method of estimating disparity information of at least a part of the view of FIG. 3, according to a particular embodiment of the invention;

FIG. 8 shows a method of estimating disparity information of at least a part of the view of FIG. 3, according to a particular embodiment of the invention.

5. DETAILED DESCRIPTION OF EMBODIMENTS OF THE INVENTION

The invention will be described in reference to a particular embodiment of the determination of disparity information associated with one or more pixels of a first view of a scene. The first view advantageously belongs to a matrix comprising a plurality of views of the same scene according to different points of view, the plurality of views resulting from the demultiplexing of a raw image acquired with a plenoptic camera. The views of the matrix different from the first view are called second views. The views are advantageously not demosaiced, i.e. at most one single color component (belonging to a color space, for example RGB color space) is associated with each pixel of the first and second views. In a first step, the color pattern of a first block of pixels of the first view is compared with the color pattern(s) of one or more second blocks of pixels of one or more second views belonging to the row or the column comprising the first view in the matrix of views. In a second step, the second block(s) which color pattern matches at least partially with the color pattern of the first block is/are selected and a disparity information to be associated with the first block (i.e. with the pixel on which the first block is centred) is determining by using the selected second block(s) and the first block.

The use of blocks of pixels in the second views and the first view that matches at least partially enables to estimate the disparity on views that are demultiplexed but not demosaiced with a good quality.

Figure 1:
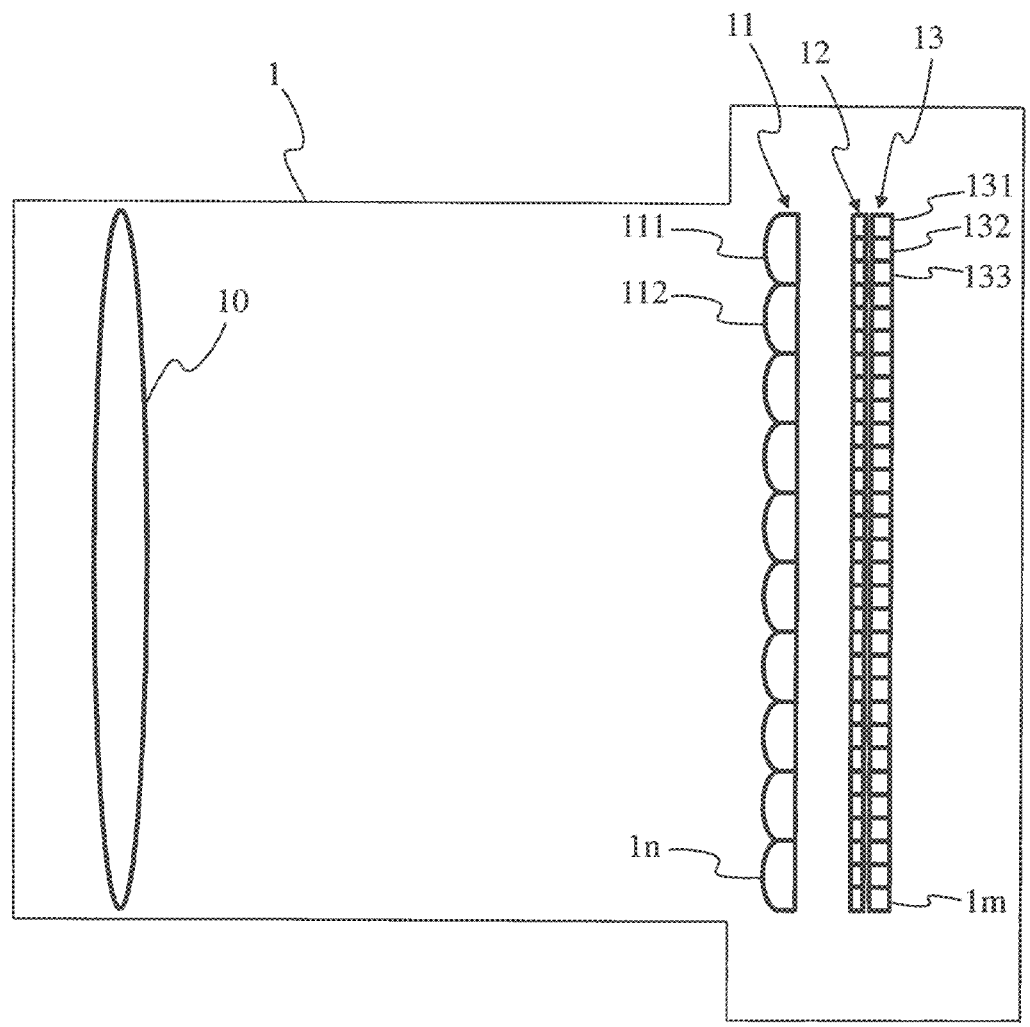
FIG. 1 shows a plenoptic camera, according to a particular embodiment of the invention.

FIG. 1 illustrates a plenoptic camera 1, according to a particular and non-limitative embodiment of the invention. The plenoptic camera 1 is composed of a lens arrangement associated with a photosensor array 13, also called image sensor array 13. The photosensor array 13 comprises a large number m of photosensors 131, 132, 133 to 1m arranged in the form of a matrix of X columns and Y rows, m corresponding to X time Y. Each photosensor corresponds to a pixel of the raw image of the scene acquired with the photosensor array, each pixel covering a part (also called a point) of the scene. For purposes of illustration, the photosensor array 13 is shown with a relative small number of photosensors 131 to 1m. Naturally, the number of photosensors is not limited to the illustration of FIG. 1 but extends to any number of photosensors, for example several thousand or several millions of photosensors, for example 12.4 megapixels, a pixel corresponding to a photosensor (e.g., corresponding to an array or matrix of 4088×3040 pixels/photosensors). Each photosensor of the plurality of photosensors optically associated with one single microlens enables to acquire raw data representative of a pixel of the scene according to one view angle. A color filter array (CFA) 12 is arranged on the photosensor array 13. The CFA 12 typically arranges RGB (Red, Green and Blue) color filters on the photosensor array, the RGB arrangement taking for the example the form of a Bayer filter mosaic. One color filter (red, green or blue filter) is advantageously associated with one photosensor according to a predetermined pattern, which comprises 50% green, 25% red and 25% blue in the example of a Bayer filter, such a pattern being also called RGBG, GRGB or RGGB pattern. The lens arrangement comprises a primary lens 10, also called main lens, and a lenslet array 11, which comprises a plurality of n microlenses 111, 112, 1n, n being a positive integer greater than or equal to 2. The microlenses 111, 112, 1n are arranged in such a way as to be optically each associated with a plurality of photosensors. An optical association of a microlens with photosensors means that the light rays passing through a given microlens reach at least one of the photosensors optically associated with this given microlens. The number of photosensors optically associated with one microlens corresponds to the number of views of the scene acquired with the plenoptic camera 1. For purposes of illustration, the lenslet array 11 is shown with a relative small number of microlenses, but the number of microlenses may extend up to several thousand or even one or several million of microlenses. To obtain the different views, the raw image (i.e. the color sensor data acquired with the photosensor array 13) is de-multiplexed then demosaiced. After the demosaicing step, RGB image data values are obtained at each pixel location for each view.

A gap is advantageously formed between the lenslet array 11 and the set color filter array 12/photosensor array 13. The gap may be composed of air, of an optical material having an index n (for example a glass layer) or of multiple layers comprising at least one layer air layer and at least one optical material layer. Using a glass layer to form the gap has the advantages of keeping the lenslet array at a same distance from the photosensor array in each and every location and of reducing this distance when needed. If d is the distance between the output of the lenslet array and the photosensor array according to a longitudinal axis, having a layer composed of an optical material with an index n (n>1, for example n=1.5) between the lenslet array and the photosensor array enables to set the distance to d/n without modifying d. By adapting/modifying the index of the optical material of the layer forming the gap, it is possible to adapt/modify a parameter representative of the distance between the lenslet array and the photosensor array without modifying the distance d. According to an embodiment, the lenslet array 11 is placed and adjusted to be approximately at one focal length f (i.e. the focal±5%) from the photosensor array 13, where f is the focal length of the microlenses. The lenslet array 11 is focused at the image plane of the primary lens 10 and the microlenses of the lenslet array 11 are focused at infinity. According to another embodiment, in order to increase or maximize spatial resolution, i.e. to achieve sharper, higher spatial resolution of microlens images, the microlenses are focused on the image created by the primary lens inside the plenoptic optical lens of the plenoptic camera 1 and in front of the lenslet array 11 (i.e. between the lenslet array 11 and the primary lens 10), instead of being focused on the primary lens itself. According to this embodiment, the lenslet array 11 may be located at distances greater than f or less than f from the photosensor array 13. For example, the lenslet array 11 may be placed at distance 4/3 f from the photosensor array 13, or at other distances that are multiple of f, e.g. 0.5 f, 1.5 f or 3/4 f.

Naturally, the arrangement of the color filters on the photosensor array 13 is not limited to a RGGB pattern. According to variants, the predetermined pattern may be a RGBE pattern with one of the green filters modified to 'Emerald' (for a block of four color filters); a CYYM pattern with one 'Cyan' filter, two 'Yellow' filters and one 'Magenta' filter (for a block of four color filters); a CYGM pattern with one 'Cyan' filter, one 'Yellow' filter, one 'Green' filter and one 'Magenta' filter; a RGBW pattern with one 'Red' filter, one 'Green' filter, one 'Blue' filter and one 'White' filter, several arrangement being possible (for example arranged on a block of four color filters with 'White' for the upper left filter, 'Red' for the upper right filter, 'Blue' for the lower left filter and 'Green' for the lower right filter; or arranged on a block of 4×4 color filters with 'White', 'Blue', 'White', 'Green' for the first row, 'Blue', 'White', 'Green', 'White' for the second row below the first row, 'White', 'Green', 'White', 'Red' for the third row below the second row and 'Green', 'White', 'Red', 'White' for the fourth row below the third row).

Figure 2:
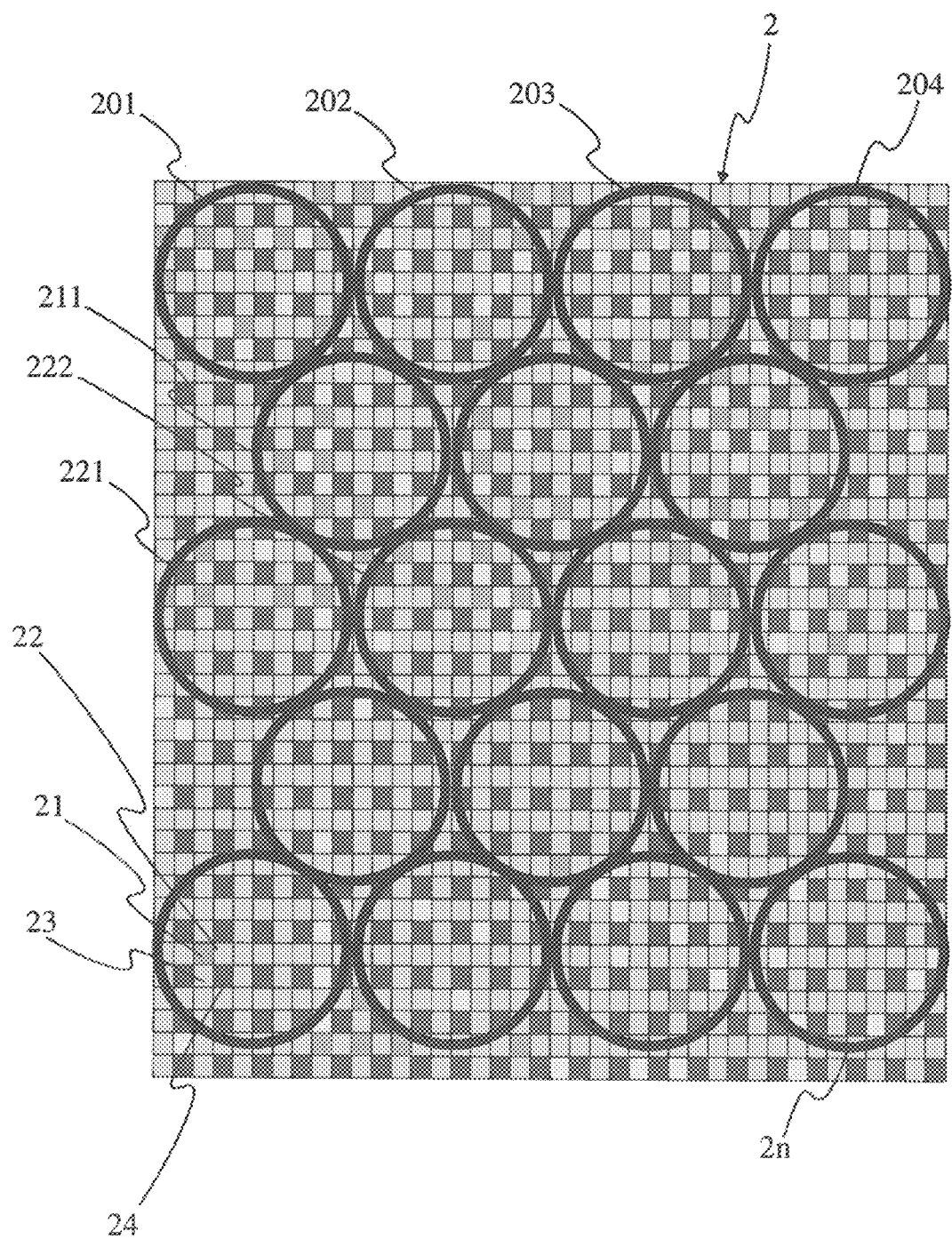
FIG. 2 shows a raw image of a scene acquired with the plenoptic camera of FIG. 1, according to a particular embodiment of the invention.

FIG. 2 illustrates a raw image 2 acquired with the plenoptic camera 1 according to a particular and non-limitative embodiment of the invention. The raw image 2 is formed with a matrix of pixels, the number of pixels corresponding to the number of photosensors of the photosensor array used for acquiring the raw image 2. One single color component is associated with each pixel of the image. In the non limitative example of FIG. 2, the single color component associated with each pixel is either R, G or B (Red, Green or Blue). The single color component associated with a given pixel of the raw image depends from the color filter associated with the photosensor used for acquiring the amount of light reaching the photosensor. The amount of light is expressed with a value representative of a level, coded for example with 8 bits (the value associated with the pixel being comprised between 0 and 255) or 10 bits (the value being comprised between 0 and 1023) or more. The value representing the amount of light reaching a photosensor associated with a color filter is associated with the pixel of the raw image corresponding to the photosensor and represents the level of the color component (corresponding to the color filter) associated with the pixel. The color pattern illustrated on FIG. 2 is RGGB (Red, Green, Green, Blue), i.e. for a block of 4 pixels 21 to 24 arranged in two rows and two columns, the upper left pixel 21 is associated with the Red color component, the upper right pixel 22 is associated with the Green color component, the lower left pixel 23 is associated with the Green color component and the lower tight pixel 24 is associated with the Blue color component. Naturally, the color pattern is dependent from the arrangement of the color filters of the CFA and may be different than the one described hereinabove. A set of microlenses 201, 202, 203, 204, 211, 221 and 2n is illustrated on FIG. 2. Each microlens 201 to 2n is optically associated with a plurality of pixels of the raw image, which correspond to the corresponding photosensors of the photosensor array optically associated with the microlenses of the lenslet array. Each microlens 201 to 2n has a circular form, all microlenses 201 to 2n advantageously having the same radius. As to optimize the coverage of the photosensors array by the lenslet array, the microlenses 201 to 2n are advantageously arranged in a quincunx arrangement, thus reducing the number of photosensors not optically associated with a microlens. The same number of pixels (or photosensors) is associated with each microlens, for example it may be comprised for example between 2 pixels (or photosensors) and up to several dozens or even one or several hundred of pixels (or photosensors). The number of pixels (or photosensors) optically associated with a microlens is not limited to an integer either but also extends to non integer numbers, for example X+½ or X+⅓, where X is an integer number.

The form of the microlenses is not limited to a circle either. Microlenses may also take the form of a square, a rectangle, a hexagon or any other form.

FIG. 3 illustrates a view of the scene resulting from the demultiplexing of the raw image 2, according to a particular and non-limitative embodiment of the invention.

The image raw 2 representative of the scene is acquired by the plenoptic camera 1 when shooting a scene, each photosensor of the photosensor array measuring the amount of light reaching it during a predetermined amount of time. This measure is advantageously encoded on 8, 9, 10 or more bits and associated with the pixel of the raw image corresponding to the photosensor. As one single color filter (for example Red, Green or Blue) is associated with each photosensor, the value representative of the luminance associated with a pixel also represents the level of the color component associated with the pixel of the raw image, the color component associated with the pixel corresponding to the color of the color filter associated with the corresponding photosensor.

To obtain the view 3, the raw image 2 is demultiplexed to obtain two or more views (including the view 3), which each represent a view of the scene according to a different point of view. The number of views images advantageously corresponds to the number of photosensors optically associated with one microlens of the lenslet array. The demultiplexing enables to reconstruct the views by selecting one pixel in each set of pixels optically associated with one microlens. As the pixels of the views images correspond to pixels selected within the raw image, at best one single color component (among the color components corresponding to the color filters of the CFA of the plenoptic camera used for acquiring the raw image) is associated with each pixel of each intermediary image.

FIG. 3 shows an example of one view 3 resulting from the raw image 2. The pixels of this particular view 3 correspond for example to the pixels of the raw image corresponding to the centre of each microlens 201 to 2n: pixel 301 is the pixel of the raw image 2 corresponding to the centre of the microlens 201, pixel 302 is the pixel of the raw image 2 corresponding to the centre of the microlens 202, pixel 303 is the pixel of the raw image 2 corresponding to the centre of the microlens 203, pixel 311 is the pixel of the raw image 2 corresponding to the centre of the microlens 211, pixel 321 is the pixel of the raw image 2 corresponding to the centre of the microlens 221, pixel 322 is the pixel of the raw image 2 corresponding to the centre of the microlens 222, etc. The color components associated with the pixels 301 to 322 of the view 3 correspond respectively to the color components associated with the pixels of the raw image 2 corresponding to the centers of the microlenses. Pixels 30, 31, 32, 33 and 34 with no color information (illustrated in white on FIG. 3) are added to the view 3. These "white" pixels 30 to 34 are added due to the quincunx arrangement of the microlenses 201 to 2n. Indeed, as the microlenses are arranged in a quincunx manner, their respective centers are not aligned in column fashion. For example, the column to which belongs the centre of the microlens 211 is located between the columns to which belong the centers of the microlenses 201, 202. As to generate the matrix of pixels forming the view 3, a pixel 30 without any color information is added between the pixels 301 and 302, this pixel 30 belonging to the row of the matrix comprising the pixels 301 and 302 and to the column of the matrix comprising the pixel 311. In a same manner, a pixel 32 with no color component is added to form the intermediary image, the pixel 32 belonging to the same row as the pixel 311 and to the same column as the pixels 301 and 321. Naturally, the arrangement of pixels illustrated on FIG. 3 as of the need to add pixels with no color component depends from the arrangement of the microlenses. For example, in the case where the microlenses have a square form, they can be regularly arranged with regard to the photosensors array, the pixels selected in each set of pixels associated with a different microlens being then perfectly aligned with each other in the each view resulting from the demultiplexing of the raw image.

Figure 4:
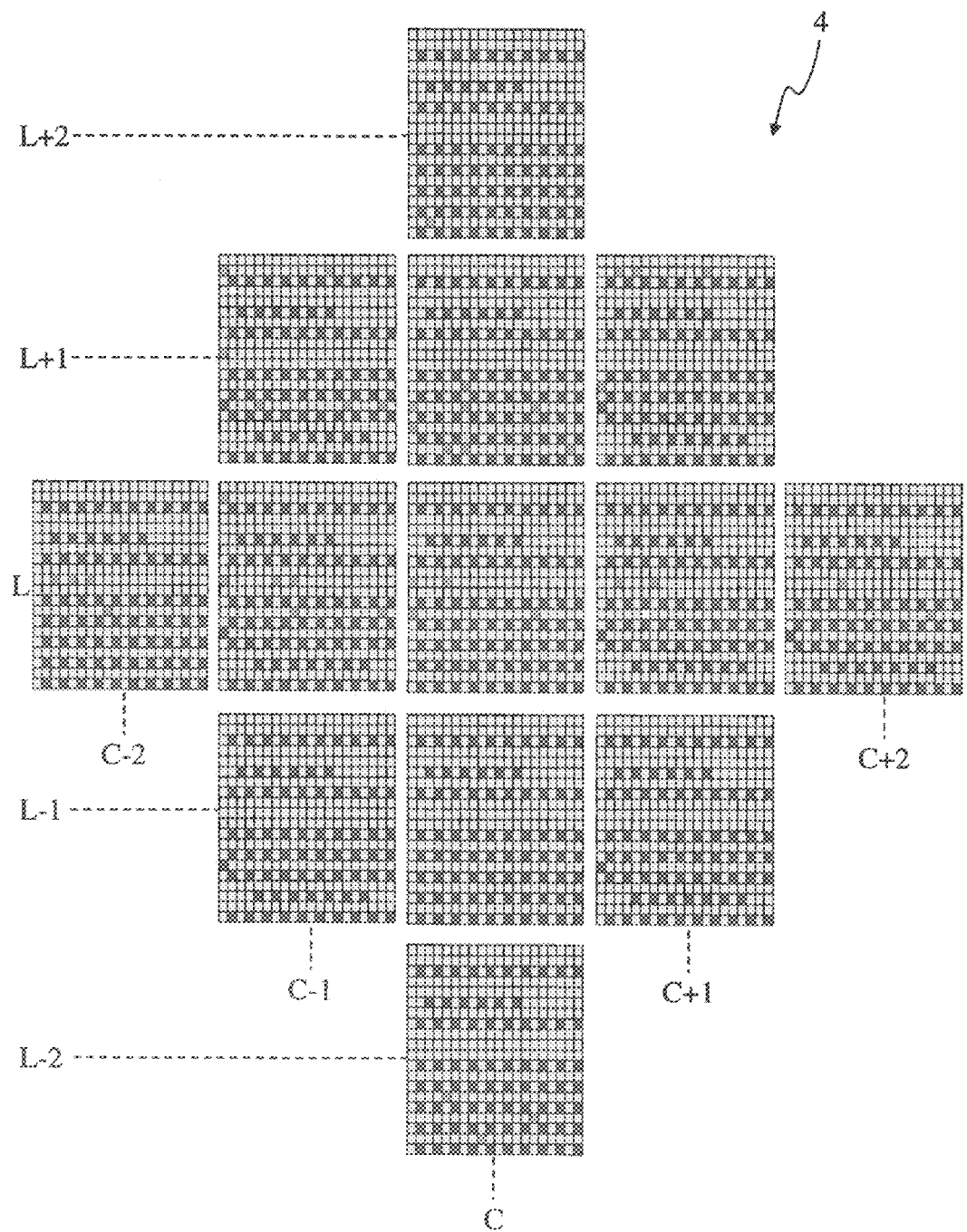
FIG. 4 shows a matrix of views resulting from the demultiplexing of the raw image of FIG. 2, according to a particular embodiment of the invention.

FIG. 4 illustrates a matrix 4 of views resulting from the demultiplexing of the raw image 2, according to a particular and non-limitative embodiment of the invention. In the example of FIG. 4, the matrix 4 comprises a set of 13 different views arranged according to five rows L−2, L−1, L, L+1, L+2 and five columns C−2, C−1, C, C+1, C+2, the view belonging to row L and column C corresponding for example to the view 3 illustrated on FIG. 3. The number of views per row (respectively per column) is different from a row (respectively) to another one. For example, the rows L−2 and L+2 (respectively the columns C−2 and C+2) each comprise one single view, the rows L−1 and L+1 (respectively the columns C−1 and C+1) each comprise three views and the row L (respectively the column C) comprises five views. The number of views in the matrix 4 corresponds to the number of pixels optically associated with each microlens of the lenslet array of the plenoptic camera and the form of the matrix 4 (circular in the example of FIG. 4) corresponds to the form of the microlenses of the lenslet array. Each view of the matrix represents the same scene acquired with the plenoptic camera but with a different point of view. The number of pixels is advantageously the same for each view, only the color arrangement varying from a view to another one.

Naturally, the form of the matrix 4 is not limited to the example of FIG. 4 but extends to any form, as the form of the matrix correspond by and large to the form of the microlenses. For example, with microlenses with a square form, the matrix of views would have a square form also, with exactly the same number of views for each row and each column of the matrix.

Figure 5:
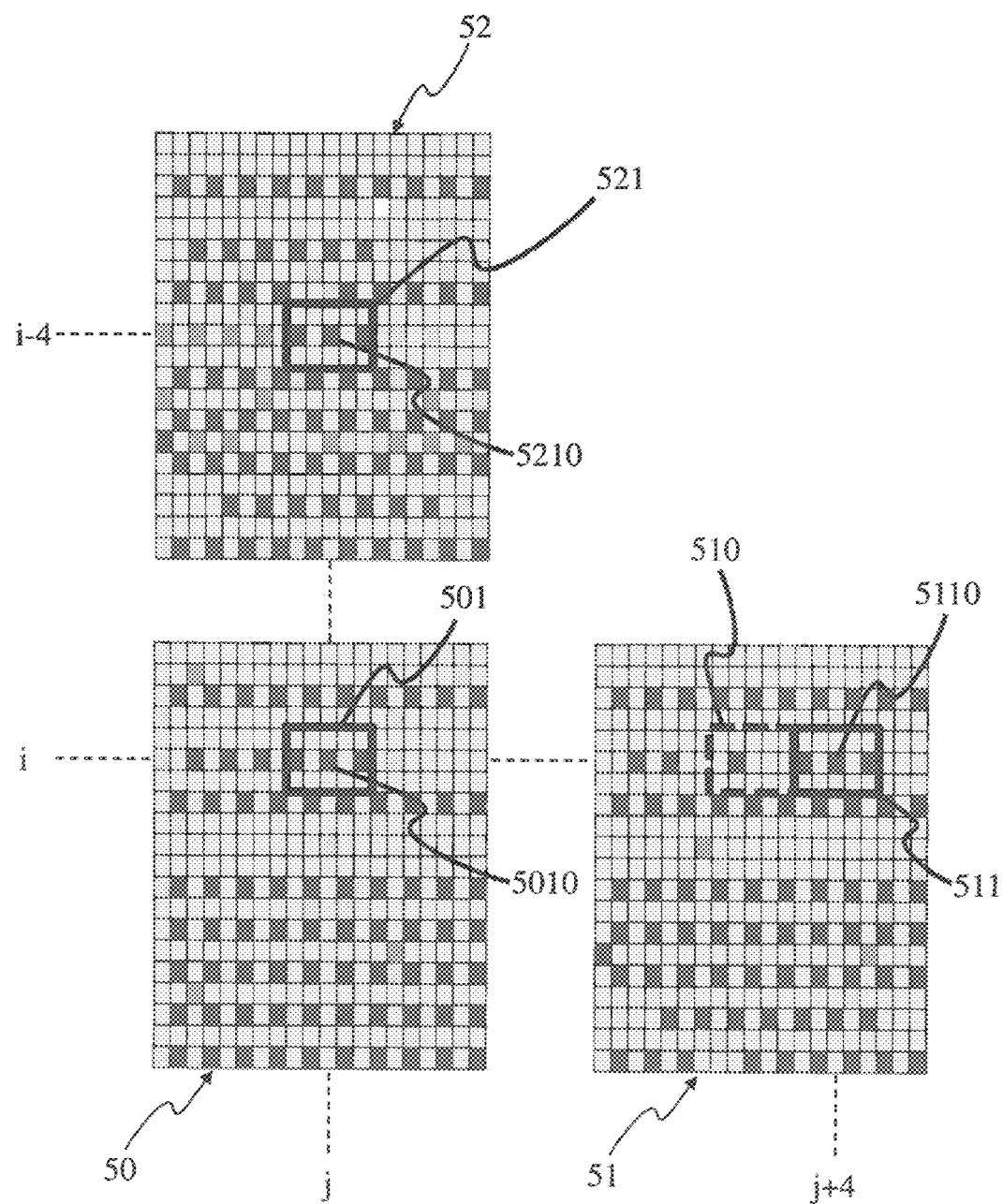
FIG. 5 shows a method of estimating disparity information from views of the matrix of FIG. 4, according to a particular embodiment of the invention.

FIG. 5 illustrates a method of estimating disparity information from views of the matrix of FIG. 4, according to a particular and non-limitative embodiment of the invention.

FIG. 5 shows a first view 50 (corresponding for example to the view at the intersection of row L and column C on FIG. 4) and two second views 51 and 52 which are different from the first view 50. The second view 51 belongs to the row comprising the first view 50 (and corresponds for example to the view at the intersection of row L and column C+1 on FIG. 4). The second view 52 belongs to the column comprising the first view 50 (and corresponds for example to the view at the intersection of row L+1 and column C on FIG. 4). A first block 501 of pixels is taken in the first view 50 as an example for illustrating the process of estimating disparity information to be associated with this first block 501. The same process may naturally be repeated for a plurality of first blocks of the first view to estimate a disparity map for the whole first view or for a part of it. The first block 501 comprises 15 pixels and is centered on the pixel 5010. The disparity information estimated for the block 501 is advantageously associated with the pixel 5010. The pixel 5010 belongs to row i and column j, which corresponds to the coordinates (i,j) of the pixel 5010 (and of the associated block of pixels 501) in a 2D space associated with the first view, where the origin corresponds for example to the upper left pixel (having (0,0) as coordinates) or to the lower left pixel. A first color pattern is associated with the first block 501, the first color pattern corresponding to the arrangement of the color components associated with the pixels of the first block 501. In the example of FIG. 5, the first color pattern is as follow, when departing from the upper left pixel and moving to the right, row by row and ending with the lower right pixel: NGNGNBNBN-BNGNGN, N standing for no color information, G for Green color component and B for Blue color component. The first color pattern is compared with second color patterns each associated with a second block 510, 511 of pixels in the second view 51 until finding a second block of pixel 511 having the same color pattern as the first block 501. The second block of pixels has the same number of pixels than the first block of pixels 501, i.e. 15 pixels in the example of FIG. 5. First and second block of pixels have advantageously the same ordinate i, or said with other words, the pixels 5010 and 5110 on which the first block 501 and the second block 511, respectively, are centered have the same ordinate i (or belongs to the same row). It is understood that the first view 50 and the second view 51 have similar 2D space with an origin being the same in each view (for example the upper left pixel for both of them) and a same number of rows and a same number of columns. To find the second block of pixels in the second view having a second color pattern identical to the first color pattern, each second block of pixels having the same number of pixels than the first block of pixels and centered around a pixel belonging to the same row than the center pixel of the first block 501 are analyzed one after each other, for example by departing from the left side of the second view and by moving forward of one column if the current second pixel does not correspond to the first block of pixel. According to a variant, adjacent second blocks of pixels are analyzed one after each other until finding the second block of pixels matching with the first block of pixels. For example, the second block of pixels 510 is tested, i.e. its second color pattern, GNGNG-NBNGNGNGNG, is compared with the first color pattern. As this second color pattern does not match with the first color pattern (i.e. this second color pattern is not identical to the first color pattern), then the second block 511 of pixels adjacent to the second block 510 of pixels and located to the right of the second block of pixels 510 is tested. As the second color pattern NGNGNBNBNBNGNGN is identical to the first color pattern, then this second block of pixels 511 is selected. This process is advantageously repeated for each and every view belonging to the same row as the first view in the matrix of views 4 to select one or several second blocks in each second view belonging to the same row as the first view. According to a variant, only a part of the second views belonging to the same row as the first view are tested, for example all second views located on the right (or on the left) of the first view, or every two views (i.e. the second views belonging to the columns C±2N, where N is an integer greater than or equal to 1, when the first view belongs to the column C).

According to a variant, a second block of pixel is selected even if its associated second color pattern partially matches with the first color pattern. According to this variant, only the pixels of the second block having the same color component than the color component associated with the corresponding pixels of the first block are used for estimating the disparity. A pixel of the first block corresponds to a pixel of the second block when the location of the pixel in the first block is the same as the location of the pixel in the second block, i.e. same row and column in both first and second block when a same referential is used within the blocks (i.e. same origin, e.g. the upper or lower left pixel of the first and second blocks) and when the referential is the block and not the view for numbering the rows and columns within a block of pixels.

The disparity information to be associated with the first block 501 (or in an equivalent way with the pixel 5010) is then determined by using the selected second block 511 and the first block 501. The disparity information corresponds for example to a first disparity value that is determined by comparing the abscissa of the pixel 5010, i.e. j in the 2D space of the first view 50, with the abscissa of the pixel 5110$n$, i.e. j+4 in the 2D space of the second view 51, the comparison referential being the same as the origins of the 2D space associated with the first view 50 and the second view 51 are similar (for example the upper left pixel for both of them or the lower left pixel for both of them). The first disparity value corresponds advantageously to the difference between these two abscissa, i.e. 4 pixels in the example of FIG. 5. If two or more second blocks of pixels are selected (in two or more second views belonging to the same row as the first view in the matrix of views), then the abscissa difference between each selected second block of pixel and the first pixels are determined (i.e. several first disparity values are determined) and the disparity information to be associated with the first block corresponds to the weighted average of these first values, the weight to be associated with each first disparity value depending from the distance D separating the first view and the second view in the row L of the matrix of views. For example, if the second views considered for selecting the second blocks are the views located on the right of the first view in the matrix of views 4, i.e. the second views belonging to the columns C+1 and C+2, the distance separating the second view of C+1 from the first view is 1.D and the distance separating the second view of C+2 from the first view is 2.D. The first disparity value d1 determined by comparing the selected second block of the second view of C+1 is then to be divided by 1 and the first disparity value d2 determined by comparing the selected second block of the second view of C+2 is then to be divided by 2. The disparity information d is then obtained as follow:

$$d = \frac{\frac{d_1}{1} + \frac{d_2}{2}}{2} \quad \text{equation 1}$$

By generalizing with m selected second blocks, we have:

$$d = \frac{\sum_m \frac{d_a}{a}}{m} \quad \text{equation 2}$$

Where a is an integer corresponding to the multiple of the distance separating the considered second view from the first view when the distance is expressed with x*D where D is the distance separating the first block and the second block adjacent to the first block on a row.

According to a variant, the first disparity value to be associated with the first block 501 (or in other words with its center pixel 5010) is determined by using an adapted SSD (Sum of Squared Difference) minimization algorithm. More precisely, the cost function at x between the first view $I_1$ and at least one second view $I_2$ is defined as follow:

$$C_x^{1,2}(d) = \frac{X_d(x) \sum_{y \in B_x} [I_1(y + a_1 d) - I_2(y + a_2 d)]^2 W_x(y)}{\sum_{y \in B_x} W_x(y)} \quad \text{equation 3}$$

where d is the disparity between the first block 501 and a selected second block in the at least one second view (for example the second block 511 in the second view 51), $W_x$ is a window function (e.g. a Gaussian) centered at x, $B_x$ is a block of pixels centered on x, y corresponding to the other pixels of the block $B_x$, and X is a characteristic function that only takes into account second color pattern(s) identical to the first color pattern ($X_d(y)=1$ if the color patterns at blocks $y+a_1 d$ and $y+a_2 d$ are the same, and $X_d(y)=0$ otherwise), the factors $a_1$ and $a_2$ are fixed values that depend on the first view and the baserow between the second view(s) and the first view (e.g., $a_1=0$ for the first view $I_1$, $a_2=1$ for the second view adjacent to the first view, $a_2=2$ for the next second view (i.e. directly adjacent to the second view adjacent to the first view) and so on).

According to a variant, X is a characteristic function that only takes into account second pixels of the second block(s) having a color information matching with a pixel of the first block (i.e. a second pixel of the second block matches a first pixel of the first block if the first and second pixels have a same location within the first and second blocks respectively and if the color component associated with the first pixel is the same as the color component associated with the second pixel). The latter variant enables to take into account second blocks of pixels only partially matching with the first block of pixels. According to this variant, the cost function is:

$$C_x^{1,2}(d) = \frac{\sum_{y \in B_x} [I_1(y + a_1 d) - I_2(y + a_2 d)]^2 W_x(y) X_d(y)}{\sum_{y \in B_x} W_x(y) X_d(y)} \quad \text{equation 3'}$$

Figure 6:
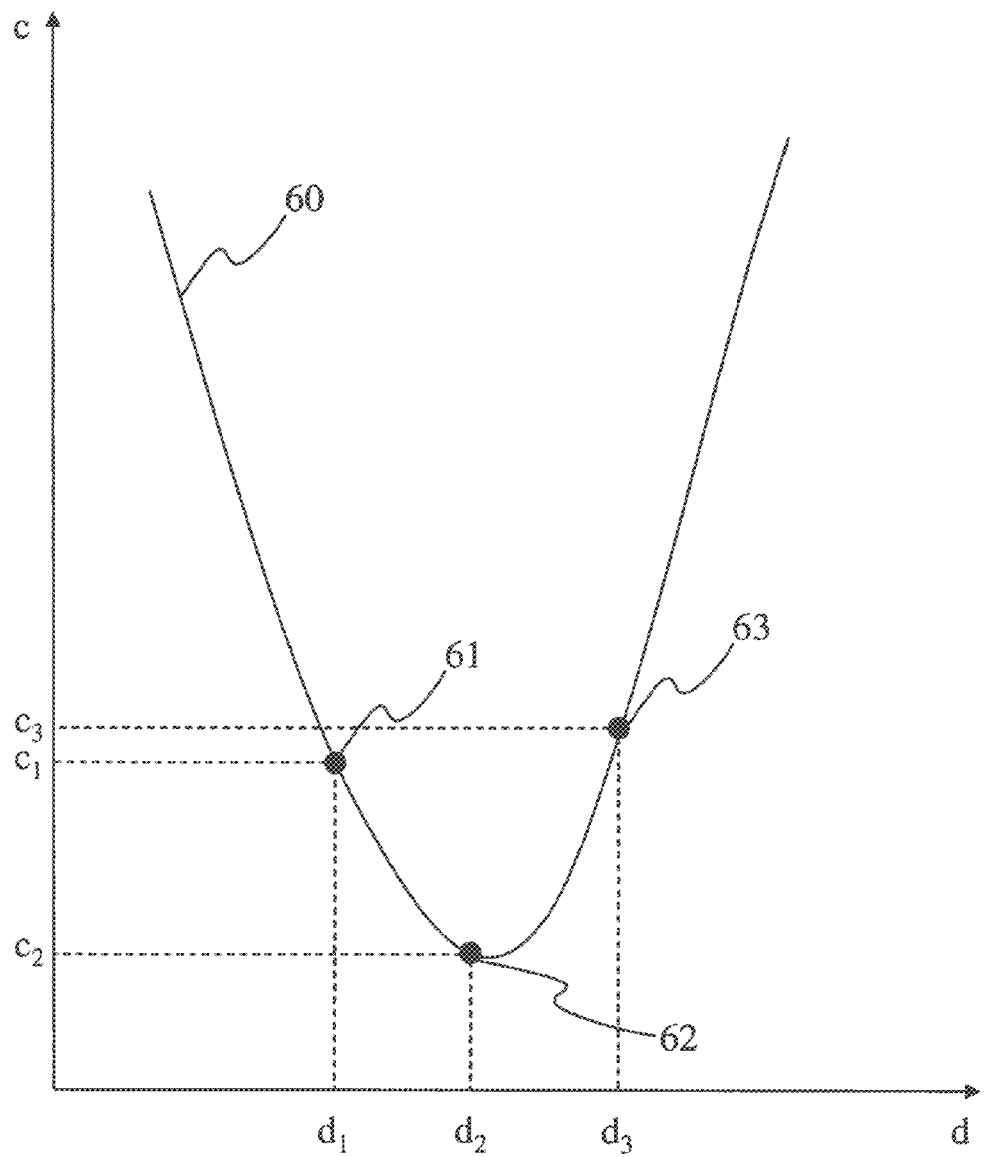
FIG. 6 shows a cost function associated with candidate disparity values used in estimating the disparity information associated with a view of the matrix of FIG. 4, according to a particular embodiment of the invention.

To obtain the disparity information from the equation 3, multiple values of d (called candidate disparity information) are tested and the value of d for which $C_x^{1,2}(d)$ is minimum is the disparity information to be associated with the first block. The tested candidate disparity information is advantageously comprised between a minimal disparity value and a maximum disparity value, which are both dependent from the plenoptic camera used for acquiring the scene, i.e. the minimal disparity value and the maximum disparity value are fixed by the plenoptic camera. The number of tested candidate disparity information d is for example equal to 44, 36 or 28. The number of tested candidate disparity information depends for example from the disparity range (between the minimal and maximal disparity values) R of the plenoptic camera, being for example [−5; 5], [−4; 4] or [−3; 3] (the number of tested candidate disparity values is for example 4*R). FIG. 6 illustrates such a cost function (or part of it) according to a non-limitative embodiment. Three candidate disparity information 61, 62 and 63 are shown on FIG. 6, the cost function corresponding, at least locally, to a hyperbolic function. The first candidate disparity information $d_1$ 61 has a cost value equal to $C_1$, the second candidate disparity information $d_2$ 62 has a cost value equal to $C_2$ and the third candidate disparity information $d_3$ 63 has a cost value equal to $C_3$. As $C_2 < C_1 < C_3$, the minimal cost value is then C2 which means that the disparity information to be associated with the first block 501 is $d_2$ 62.

According to other variants, other disparity estimators such as ZSSD (Zero-mean Sum of Squared Difference) or NCC (Normalized Cross Correlation) are used and adapted as the SSD minimization algorithm for determining the first disparity value.

The comparison process between the second view 51 and the first view 50 which belong to the same row L of the matrix of views 4 is advantageously performed between the second view 52 and the first view 50 which belong to the same column C of the matrix of views 4. According to a variant, the first block of pixels 501 (i.e. its first color pattern) is compared with several second blocks of pixels of several second views belonging to the column of the matrix of views comprising the first view 50. In the same way than the second block of pixels 511 has been selected, the second block of pixels 521 is selected as it has a second color pattern NGNGNBNBNBNGNGN identical to the first color pattern. This process is advantageously repeated for each and every second view belonging to the same column as the first view in the matrix of views 4 to select one or several second blocks in each second view belonging to the same column as the first view. According to a variant, only a part of the second views belonging to the same column as the first view are tested, for example all second views located above (or below) of the first view, or every two views (i.e. the second views belonging to the rows L±2N, where N is an integer greater than or equal to 1, when the first view belongs to the row L). According to another variant, second block partially matching with the first block are also selected, only the pixels of the second block(s) matching first pixels of the first block of pixel being used for estimated the second disparity value. The disparity information to be associated with the first block 501 (or in an equivalent way with the pixel 5010)

is then determined by using the selected second block 521 and the first block 501. The disparity information corresponds for example to a second disparity value that is determined by comparing the ordinate of the pixel 5010, i.e. i in the 2D space of the first view 50, with the ordinate of the pixel 5210, i.e. i−4 in the 2D space of the second view 52, the comparison referential being the same as the origins of the 2D space associated with the first view 50 and the second view 52 are similar (for example the upper left pixel for both of them or the lower left pixel for both of them) and the number of rows (respectively columns) are identical in both first view 50 and second view 52. The second disparity value corresponds advantageously to the difference between these two ordinates, i.e. −4 pixels in the example of FIG. 5. If two or more second blocks of pixels are selected (in two or more second views belonging to the same row as the first view in the matrix of views), then the ordinates difference between each selected second block of pixel and the first pixels are determined (i.e. several second disparity values are determined) and the disparity information to be associated with the first block corresponds to the weighted average of these first values, the weight to be associated with each first disparity value depending from the distance D separating the first view and the second view in the column C of the matrix of views, as explained with regard to the first view 50 and the second view 51 belonging to the same row of the matrix of views.

According to variants, and as explained hereinabove with regard to first and second views of a same row of the matrix of views, the second disparity value to be associated with the first block 501 (or in other words with its center pixel 5010) is determined by using the adapted SSD (Sum of Squared Difference) minimization algorithm, i.e. by using the equation 3.

According to other variants, other disparity estimators such as ZSSD (Zero-mean Sum of Squared Difference) or NCC (Normalized Cross Correlation) are used and adapted as the SSD minimization algorithm for determining the second disparity value.

According to an advantageous embodiment, one first disparity value representative of the horizontal disparity (i.e. determined by using second block(s) of pixel and the first block of pixel belonging to the same row of the matrix of views) is determined and one second disparity value representative of the vertical disparity (i.e. determined by using second block(s) of pixel and the first block of pixel belonging to the same column of the matrix of views) is also determined. The disparity information to be associated with the first block of pixel 501 is then either the first disparity value or the second disparity value. The choice between the first disparity value and the second disparity value is advantageously based on confidence levels associated with the first and second disparity value, the chosen disparity value to be used as the disparity information to be associated with the first block of pixels 501 being for example the one having the best confidence level. According to another example, the chosen disparity value to be used as the disparity information is the one having the lowest value (or the biggest value). According to a variant, the disparity information to be associated with the first block of pixels 501 corresponds to the average of the first disparity value and of the second disparity value. Advantageously, before using the first and second disparity values for determining the disparity information to be associated with the first block of pixels 501, it is first checked that the first disparity value is close from the second disparity value, or said in other words, it is first checked that the difference between the first disparity value and the second disparity value is close to 0, or less than a threshold value (for example less than 0.5 pixel or less than 0.25 pixel). Indeed, with views acquired with a plenoptic camera and for a given pixel of the first view, the horizontal disparity between a (horizontal) second view and the first view (i.e. the horizontal disparity between the pixel of the second view corresponding to the given pixel of the first view) of a same row in the matrix of views, the horizontal second view being located at a distance N.D (N≥1) from the first view is theoretically the same as the vertical disparity between a (vertical) second view and the first view (i.e. the vertical disparity between the pixel of the second view corresponding to the given pixel of the first view) of a same column in the matrix of views, the vertical second view being located at a same distance N.D (N≥1) from the first view than the horizontal second view.

According to another variant, to obtain subpixel accuracy in the disparity determination (with a detail level below one pixel, for example with an accuracy equal to ¼ or ½ pixel), the first and second views are oversampled by interpolating the first and second views obtained by demultiplexing the raw image. According to a variant, the cost function is oversampled by interpolating the cost function described with regard to FIG. 6. According to another variant, both views and cost function are oversampled (for example with a factor 4). As an example, a cubic sprow is used to interpolate the first and second views horizontally (by a factor 4) and a quadratic interpolation is used to interpolate the cost function (using for example three points) around the minimum of the cost function. Interpolating both the views and the cost function enables to obtain an optimal trade-off between accuracy and complexity. Once the first disparity value and/or second disparity value has (have) been determined by using the interpolated views and/or interpolated cost function, the disparity information just needs to be divided by the factor used for the oversampling of the views, which enables to obtain subpixel accuracy (for example, if the oversampling factor is equal to 4, subpixel accuracy that may be obtained is equal to 1 pixel divided by 4, i.e. ¼ pixel accuracy).

FIG. 7 diagrammatically shows a hardware embodiment of a circuit or device 7 configured for estimating disparity information of at least a part of a view comprised in a matrix of views resulting from the demultiplexing of a raw image of a scene acquired with a plenoptic camera, according to a particular and non-limitative embodiment. The device 7 is also configured for the creation of display signals of one or several final images representative of the scene acquired with the plenoptic camera according to different points of view. The device 7 is for example integrated into the plenoptic camera or deported in a personal computer (PC), a laptop, a tablet, a Smartphone or a games console. The raw image is advantageously received by the device/circuit 7, the transfer of the raw image being performed wirelessly, via a wire connection or via any support like a memory (for example of the flash type).

The device 7 comprises the following elements, connected to each other by a bus 75 of addresses and data that also transports a clock signal:
  a microprocessor 71 (or CPU),
  a graphics card 72 comprising:
    several Graphical Processor Units (or GPUs) 720,
    a Graphical Random Access Memory (GRAM) 721,
  a non-volatile memory of ROM (Read Only Memory) type 76,
  a Random Access Memory or RAM 77, one or several I/O (Input/Output) devices 74 such as for example a keyboard, a mouse, a webcam, and a power source 78.

The device 7 also comprises a display device 73 of display screen type directly connected to the graphics card 72 to display synthesized final images calculated and composed in the graphics card, for example live. The use of a dedicated bus to connect the display device 73 to the graphics card 72 offers the advantage of having much greater data transmission bitrates and thus reducing the latency time for the displaying of images composed by the graphics card. According to a variant, a display device is external to the device 7 and is connected to the device 7 by a cable or wirelessly for transmitting the display signals. The device 7, for example the graphics card 72, comprises an interface for transmission or connection (not shown in FIG. 7) adapted to transmit a display signal to an external display means such as for example an LCD or plasma screen or a videoprojector.

It is noted that the word "register" used in the description of memories 721, 76 and 77 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 71 loads and executes the instructions of the program contained in the RAM 77.

The random access memory 77 notably comprises:

in a register 770, the operating program of the microprocessor 71 responsible for switching on the device 7, parameters 771 representative of the scene (for example the single color component value associated with the pixels of the raw image.).

The algorithms implementing the steps of the method specific to the invention and described hereafter are stored in the memory GRAM 721 of the graphics card 72 associated with the device 7 implementing these steps. When switched on and once the parameters 771 representative of the environment are loaded into the RAM 77, the graphic processors 720 of the graphics card 72 load these parameters into the GRAM 721 and execute the instructions of these algorithms in the form of microprograms of "shader" type using HLSL (High Level Shader Language) language or GLSL (OpenGL Shading Language) for example.

The random access memory GRAM 421 notably comprises:

in a register 7211, the parameters representative of the scene/raw image, in a register 7212, the parameters representative of the first and second views of the matrix of views (e.g. the color information associated with the pixels of the views), in a register 7213, the disparity information associated with the pixels of the first view and/or of other views of the matrix of views, the disparity information taking for example the form of a disparity map associated with the first view and/or the other views.

According to another variant, a part of the RAM 77 is assigned by the CPU 71 for storage of the identifiers and the distances if the memory storage space available in GRAM 721 is insufficient. This variant however causes greater latency time in the composition of an image comprising a representation of the environment composed from microprograms contained in the GPUs as the data must be transmitted from the graphics card to the random access memory 77 passing by the bus 75 for which the transmission capacities are generally inferior to those available in the graphics card for transmission of data from the GPUs to the GRAM and vice-versa.

According to another variant, the power supply 78 is external to the device 7.

FIG. 8 illustrates estimating disparity information of at least a part of a first view comprised in a matrix of views resulting from the demultiplexing of a raw image of a scene acquired with a plenoptic camera, according to a particular and non-limitative embodiment of the invention.

In a first step 81, the first color pattern of a first block of pixel(s) of the first view is compared with one or more second color patterns each associated with one second block of pixel(s) of one or more second views of the matrix of views. A color pattern associated with a block of pixel (i.e. a block formed of one or more pixels of a view) corresponds to the arrangement of the single color information associated with each pixel of the block, the single color information corresponding to one of the color component of the color space used for acquiring the raw image or to the lack of any color information (black pixel). The second view(s) comprising the second block(s) of pixel(s) compared with the first block of pixel(s) advantageously belong to the row or column comprising the first view in the matrix of views obtained by demultiplexing the raw image. The first and second blocks of pixel(s) which are compared with each other advantageously comprise the same number of pixel(s), i.e. one or more pixels.

Then during a second step 82 one or more second blocks of pixel(s) is (are) selected for each second view. The selected second block(s) correspond advantageously to the second block(s) having an associated second color pattern fully matching with the first color pattern. According to another variant, only part(s) of the second block are selected, the part(s) of the second block(s) that are selected corresponding to the part(s) of the second block(s) which match with the corresponding part(s) of the first block. A part of a block corresponds to one or several pixels of the block. If several pixels, these pixels may be adjacent or isolated. A pixel of a second pixel is considered as corresponding (or matching) with a pixel of the first block if the location of the pixel in the second block (i.e. row and column in the second block to which it belongs) is the same as the corresponding pixel in the first block (same row and same column in the first block, the reference for the row and column number being the block and not the view) and if the color component associated with the pixel of the second block is the same as the color component associated with the pixel in the first block.

Then during a third step 83, the disparity information is determined by using the selected second block(s) (or part(s) of the second block(s)) and the first block, as described hereinabove with regard to FIG. 5. The determined disparity information is advantageously associated with the centre of the first block of pixels when it comprises several pixels.

Steps 81 to 83 are advantageously reiterated to obtain disparity information for each pixel of the first view. According to a variant, only a part of the pixels of the first view are assigned a disparity information, for example the centre of the first view or parts of the view comprising objects of interest (which may be detected with, for example, a saliency map associated with the first view).

Naturally, the invention is not limited to the embodiments previously described.

In particular, the invention is not limited to a method of determining disparity information to be associated with at least a part of a view of a matrix of views but also extends to any device or circuit implementing this method and notably any devices comprising at least one GPU. The implementation of calculations necessary to the demultiplexing and/or to the determination of the disparity information is not limited either to an implementation in shader type microprograms but also extends to an implementation in any program type, for example programs that can be executed by a CPU type microprocessor or any processing unit taking for example the form of a programmable logical circuit of type FPGA (Field-Programmable Gate Array), an ASIC (Application-Specific Integrated Circuit) or a DSP (Digital Signal Processor).

The color space used for processing the raw image and the views of the matrix of views is not limited to the RGB color space but also extends to any other color space, for example the CYYM, CYCM or RGBW color spaces.

The use of the invention is not limited to a live utilisation but also extends to any other utilisation, for example for processing known as postproduction processing in a recording studio for the display of synthesized images for example.

The invention also relates to a method (and a device configured) for computing disparity map(s) associated with different views of the scene acquired with a plenoptic camera. The invention further relates to a method and device for encoding the disparity information associated with the pixels of the views and/or of the images resulting from the demultiplexing and the demosaicing of the raw image.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphone, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of determining a disparity information associated with at least a part of a first view of a scene, a matrix of views comprising said first view and a plurality of second views of the scene different from the first view being obtained from a raw image of the scene acquired with a plenoptic camera, a plurality of color components being associated with pixels of the raw image in such a way that each single color component of the plurality of color components is associated with a different pixel of the raw image according to a predetermined pattern, said first and second views each comprising pixels selected among the pixels of the raw image with the associated single color component, the method comprising:

selecting at least one second block of at least one pixel in at least one second view belonging to the row comprising the first view in the matrix, the at least one second block being selected if a second color pattern associated with said at least one second block corresponds at least partially to a first color pattern associated with a first block of at least one pixel of the first view, selecting at least one second block of at least one pixel in at least one second view belonging to the column comprising the first view in the matrix, the at least one second block being selected if a second color pattern associated with said at least one second block corresponds at least partially to said first color pattern, determining the disparity information associated with said first block according to a first disparity value and a second disparity value when a difference between the first disparity value and the second disparity value is less than a determined value, the first disparity value being determined by using the first block and at least one selected second block belonging to the row comprising the first view and the second disparity value being determined by using the first block and at least one selected second block belonging to the column comprising the first view.

2. The method according to claim 1, wherein a first disparity level is determined for each second view belonging to the row comprising the first view and having a second block with a second color pattern corresponding to the first color pattern, the first disparity value corresponding to the median value of said first disparity levels, and wherein a second disparity level is determined for each second view belonging to the column comprising the first view and having a second block with a second color pattern corresponding to the first color pattern, the second disparity value corresponding to the median value of said second disparity levels.

3. The method according to claim 1, wherein the disparity information corresponds to one of the first disparity value and the second disparity value.

4. The method according to claim 1, wherein the disparity information corresponds to the average of said first disparity value and second disparity value.

5. The method according to claim 1, wherein a cost function associated with a plurality of candidate disparity information is computed, the plurality of candidate information taking values comprised between a minimal disparity value and a maximal disparity value, the minimal and maximal disparity values depending from the plenoptic camera, wherein the determined disparity information corresponds to the candidate disparity information for which the cost function is minimal.

6. The method according to claim 5, wherein the method further comprises interpolating said cost function and interpolating said first view and said at least one second view before determining the disparity information.

7. A device configured for determining a disparity information associated with at least a part of a first view of a scene, a matrix of views comprising said first view and a plurality of second views of the scene different from the first view being obtained from a raw image of the scene acquired with a plenoptic camera, a plurality of color components being associated with pixels of the raw image in such a way that each single color component of the plurality of color components is associated with a different pixel of the raw image according to a predetermined pattern, said first and second views each comprising pixels selected among the pixels of the raw image with the associated single color component, the device comprising at least one processor configured for:

selecting at least one second block of at least one pixel in at least one second view belonging to the row comprising the first view in the matrix, the at least one second block being selected if a second color pattern associated with said at least one second block corresponds at least partially to a first color pattern associated with a first block of at least one pixel of the first view, selecting at least one second block of at least one pixel in at least one second view belonging to the column comprising the first view in the matrix, the at least one second block being selected if a second color pattern associated with said at least one second block corresponds at least partially to said first color pattern, determining the disparity information associated with said first block according to a first disparity value and a second disparity value when a difference between the first disparity value and the second disparity value is less than a determined value, the first disparity value being determined by using the first block and at least one selected second block belonging to the row comprising the first view and the second disparity value being determined by using the first block and at least one selected second block belonging to the column comprising the first view.

8. The device according to claim 7, wherein the at least one processor is further configured for:

determining a first disparity level for each second view belonging to the row comprising the first view and having a second block with a second color pattern corresponding to the first color pattern, the first disparity value corresponding to the median value of said first disparity levels, determining a second disparity level for each second view belonging to the column comprising the first view and having a second block with a second color pattern corresponding to the first color pattern, the second disparity value corresponding to the median value of said second disparity levels.

9. The device according to claim 7, wherein the at least one processor is further configured for determining a cost function associated with a plurality of candidate disparity information, the plurality of candidate information taking values comprised between a minimal disparity value and a maximal disparity value, the minimal and maximal disparity values depending from the plenoptic camera, wherein the determined disparity information corresponds to the candidate disparity information for which the cost function is minimal.

10. The device according to claim 9, wherein the at least one processor is further configured for interpolating said cost function and interpolating said first view and said at least one second view before determining the disparity information.

11. The device according to claim 7, wherein the disparity information corresponds to one of the first disparity value and the second disparity value.

12. The device according to claim 7, wherein the disparity information corresponds to the average of said first disparity value and second disparity value.

13. A non-transitory processor readable medium having stored therein instructions for causing a processor to perform the method according to claim 1.

* * * * *